United States Patent
Lee et al.

(10) Patent No.: US 10,093,760 B2
(45) Date of Patent: Oct. 9, 2018

(54) VINYL CHLORIDE-VINYL ACETATE COPOLYMER AND METHOD OF PREPARING THE SAME

(71) Applicant: LG CHEM, LTD., Seoul (KR)

(72) Inventors: Chan Hee Lee, Daejeon (KR); Kwang Jin Lee, Daejeon (KR); Hyun Min Lee, Daejeon (KR); Kyung Seog Youk, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/543,174

(22) PCT Filed: Sep. 9, 2016

(86) PCT No.: PCT/KR2016/010134
§ 371 (c)(1),
(2) Date: Jul. 12, 2017

(87) PCT Pub. No.: WO2017/047987
PCT Pub. Date: Mar. 23, 2017

(65) Prior Publication Data
US 2018/0002466 A1    Jan. 4, 2018

(30) Foreign Application Priority Data

Sep. 14, 2015  (KR) .................. 10-2015-0129709
Sep. 6, 2016  (KR) .................. 10-2016-0114396

(51) Int. Cl.
  *C08F 214/06*  (2006.01)
  *C08F 2/24*  (2006.01)
  *C08F 218/08*  (2006.01)

(52) U.S. Cl.
  CPC .............. *C08F 214/06* (2013.01); *C08F 2/24* (2013.01); *C08F 218/08* (2013.01)

(58) Field of Classification Search
  CPC .................................................. C08F 214/06
  See application file for complete search history.

(56) References Cited

U.S. PATENT DOCUMENTS

| | | | |
|---|---|---|---|
| 3,091,597 A * | 5/1963 | Henriques, III | C08K 13/02 524/292 |
| 4,195,168 A | 3/1980 | Bobbin | |
| 5,994,485 A | 11/1999 | Otake et al. | |
| 2008/0221292 A1 | 9/2008 | Kaiser et al. | |

FOREIGN PATENT DOCUMENTS

| | | |
|---|---|---|
| JP | S58-208306 A | 12/1983 |
| JP | 06-234827 A | 8/1994 |
| JP | 07-304921 A | 11/1995 |
| JP | 11-217475 A | 8/1999 |
| JP | 2000-302805 A | 10/2000 |
| JP | 2002-293813 A | 10/2002 |
| JP | 2007-308526 A | 11/2007 |
| JP | 2008-544010 A | 12/2008 |
| JP | 2009-221335 A | 10/2009 |
| KR | 10-1998-0087340 A | 12/1998 |
| KR | 10-2008-0017644 A | 2/2008 |
| KR | 10-2008-0026970 A | 3/2008 |
| KR | 10-2014-0093873 A | 7/2014 |

* cited by examiner

*Primary Examiner* — Robert D. Harlan
(74) *Attorney, Agent, or Firm* — Dentons US LLP

(57) ABSTRACT

The present invention relates to a vinyl chloride-vinyl acetate copolymer, which may exhibit excellent tensile strength even during low-temperature processing, and a method of preparing the same. The copolymer according to the present invention may exhibit excellent tensile strength even during low-temperature processing by including a vinyl acetate-derived unit in a specific ratio and having a specific range of polydispersity index, for example, a polydispersity index of 2.1 to 2.4, at a degree of polymerization of 1,200 to 1,300. Thus, the vinyl chloride-vinyl acetate copolymer according to the present invention and the method of preparing the same may be easily applied to industries that need them, particularly, automotive industry or polyvinyl chloride resin industry.

17 Claims, No Drawings

VINYL CHLORIDE-VINYL ACETATE COPOLYMER AND METHOD OF PREPARING THE SAME

CROSS-REFERENCE TO RELATED APPLICATIONS

This application is a National Stage Application of International Application No. PCT/KR2016/010134 filed on Sep. 9, 2016, which claims the benefit of Korean Patent Application No. 10-2015-0129709 filed on Sep. 14, 2015 and Korean Patent Application No. 10-2016-0114396 filed on Sep. 6, 2016, all of which are hereby incorporated by reference in their entirety for all purposes as if fully set forth herein.

TECHNICAL FIELD

Technical Field

The present invention relates to a vinyl chloride-vinyl acetate copolymer, which may exhibit excellent tensile strength even during low-temperature processing, and a method of preparing the same.

BACKGROUND ART

A vinyl chloride-based resin is a general-purpose resin that is the most widely used in the world as a living and industrial material, wherein it is known that the vinyl chloride-based resin may be prepared by homopolymerization of a vinyl chloride monomer and may also be prepared by copolymerization of the vinyl chloride monomer with various monomers. The vinyl chloride-based resin has been widely used for many years in various applications and many attempts are currently being made to improve physical properties of the vinyl chloride-based resin.

A vinyl chloride-based copolymer, which is prepared by copolymerization of a vinyl chloride monomer with various monomers, has an effect of improving thermoplasticity or fluidity of a polymer after processing and improving solubility. In general, the vinyl chloride-based copolymer has been used as a means to reduce difficulties in processing conditions required for processing a desired final product.

Among the vinyl chloride-based copolymers, a vinyl chloride-vinyl acetate copolymer, which is prepared by copolymerization of a vinyl chloride monomer with a vinyl acetate monomer, is known as the most important product to date. The use of the vinyl chloride-vinyl acetate copolymer mostly matches with the use of a vinyl chloride polymer (PVC), but, since price of vinyl acetate is almost two times higher than price of vinyl chloride, the use is often determined by the price.

However, since a range of processing temperature expands and flow and gloss during processing, adhesiveness, and mechanical strength vary even if an amount of the copolymerized vinyl acetate is very small, applications for various purposes are being considered by considering the above characteristics.

The vinyl chloride-vinyl acetate copolymer has been used in a wide variety of applications such as a vinyl flooring material, a vinyl and textile laminate used in furniture, wallpaper, wallpaper for interior home decoration, a curtain, a floor mat, and a sealant or an automotive underbody coating.

With respect to the sealant or the automotive underbody coating, products have been produced by being processed at a lower processing temperature than a typical processing temperature due to productivity and eco-friendly issues. However, with respect to the products processed at a lower processing temperature, tensile strength may be relatively reduced in comparison to products processed at a relatively higher processing temperature.

Thus, in order to easily apply the vinyl chloride-vinyl acetate copolymer to industries, particularly, sealant or automotive underbody coating industry, there is a need to develop a vinyl chloride-vinyl acetate copolymer which may have excellent tensile strength properties even if the vinyl chloride-vinyl acetate copolymer is processed under a low processing temperature condition.

DISCLOSURE OF THE INVENTION

Technical Problem

The present invention provides a vinyl chloride-vinyl acetate copolymer which may exhibit excellent tensile strength even during low-temperature processing.

The present invention also provides a method of preparing the vinyl chloride-vinyl acetate copolymer.

Technical Solution

According to an aspect of the present invention, there is provided a vinyl chloride-vinyl acetate copolymer which has a polydispersity index (PDI) of 2.1 to 2.4 at a degree of polymerization of 1,200 to 1,300 and includes 4 wt % to 7 wt % of a vinyl acetate-derived unit.

According to another aspect of the present invention, there is provided a method of preparing the vinyl chloride-vinyl acetate copolymer including the steps of: initiating a polymerization reaction after mixing 50 wt % to 80 wt % of a vinyl chloride monomer among a total amount of 100 wt % of the vinyl chloride monomer with 5.5 parts by weight to 10 parts by weight of vinyl acetate based on the total amount of 100 parts by weight of the vinyl chloride monomer and homogenizing the mixture (step 1); and adding 20 wt % to 50 wt % of the vinyl chloride monomer after the initiation of the polymerization reaction to allow the vinyl chloride monomer to participate in the polymerization reaction (step 2).

Advantageous Effects

A vinyl chloride-vinyl acetate copolymer according to the present invention may exhibit excellent tensile strength even during low-temperature processing by having a specific amount of a vinyl acetate-derived unit and a specific range of polydispersity index, for example, a polydispersity index of 2.1 to 2.4, at a degree of polymerization of 1,200 to 1,300.

Also, in a method of preparing a vinyl chloride-vinyl acetate copolymer according to the present invention, since a total amount of a vinyl chloride monomer is not collectively added before initiation of a polymerization reaction but a portion of the total amount of the vinyl chloride monomer used in the polymerization is added with a vinyl acetate monomer before the initiation of the polymerization reaction to initiate the polymerization reaction and a remaining portion is then collectively added or continuously added at a specific point in time, for example, at ⅓ or more of total reaction time, to allow the remaining portion to participate in the polymerization reaction, the method may obtain a polydispersity index within the above range while easily forming a vinyl chloride-vinyl acetate copolymer.

In addition, a processed product manufactured by low-temperature processing of a plastisol including the vinyl chloride-vinyl acetate copolymer according to the present invention may have excellent tensile strength.

Therefore, the vinyl chloride-vinyl acetate copolymer according to the present invention and the method of preparing the same are suitable for industries that need them, particularly, automotive industry or polyvinyl chloride resin industry.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a vinyl chloride-vinyl acetate copolymer which may exhibit excellent tensile strength properties even during low-temperature processing.

Since a vinyl chloride-vinyl acetate copolymer has excellent characteristics, such as flow and gloss during processing, and good physical properties, the vinyl chloride-vinyl acetate copolymer has been used in a wide variety of fields, for example, a sealant or an automotive underbody coating in automotive industry as well as wallpaper for house interior, a curtain, and a floor mat. In general, the vinyl chloride-vinyl acetate copolymer is mixed with various additives, such as a colorant and a heat stabilizer, to prepare a processing composition, and the composition is being prepared and used as products in the various fields as described above by different processing routes depending on the purpose, for example, an extrusion process, a calendaring process, an injection process, and paste processing.

For example, the sealant or the automotive underbody coating is being prepared by paste processing in which a product is manufactured by a process, such as dipping, spraying, and coating, using a vinyl chloride-vinyl acetate copolymer plastisol, and the processing is being performed under a temperature condition of 160° C. to 180° C. or more. Recently, in line with the increased interest in productivity and environment of automotive industry, a method of improving the productivity by increasing ease of processing and simultaneously manufacturing a product in a more environmentally friendly manner has been conducted. For example, a product has been manufactured by processing under a relatively low processing temperature condition, and a method of further reducing the processing temperature has been reviewed. However, in a case in which the processing is performed at a low processing temperature, tensile strength of the product may be reduced, and an amount of the tensile strength reduced is more increased as the processing temperature is further reduced. Therefore, in order to easily apply the vinyl chloride-vinyl acetate copolymer to a changing industrial environment (e.g., productivity and environment issues), there is a need to develop a vinyl chloride-vinyl acetate copolymer from which a product having excellent tensile strength may be obtained even during low-temperature processing.

Thus, the present invention provides a vinyl chloride-vinyl acetate copolymer which may exhibit excellent tensile strength properties even during low-temperature processing.

The vinyl chloride-vinyl acetate copolymer according to an embodiment of the present invention has a polydispersity index (PDI) of 2.1 to 2.4 at a degree of polymerization of 1,200 to 1,300 and includes 4 wt % to 7 wt % of a vinyl acetate-derived unit.

Specifically, the vinyl chloride-vinyl acetate copolymer may have a polydispersity index (PDI) of greater than 2.1 and less than 2.3 at a degree of polymerization of 1,200 to 1,300 and may include 5 wt % to 6 wt % of the vinyl acetate-derived unit.

In a case in which the vinyl chloride-vinyl acetate copolymer includes the vinyl acetate-derived unit in an amount outside the above range of 4 wt % to 7 wt %, low-temperature tensile strength of a processed product, which is manufactured by low-temperature processing of the vinyl chloride-vinyl acetate copolymer, may be significantly reduced. Herein, the low-temperature tensile strength is as described later.

The expression "derived unit" in the present invention may denote a structure or component generated by a certain material or may denote the certain material itself. For example, the vinyl acetate-derived unit may denote a structure or component from vinyl acetate or may denote a structure of the vinyl acetate itself.

Also, the vinyl chloride-vinyl acetate copolymer according to the embodiment of the present invention has a weight-average molecular weight (Mw) of 160,000 g/mol to 165,000 g/mol.

The expression "degree of polymerization" in the present invention denotes the number of repeating units (monomers) constituting a polymer.

The expression "polydispersity index" in the present invention denotes a molecular weight distribution of the polymer, wherein it is a value representing a ratio (Mw/Mn) of a weight-average molecular weight (Mw) to a number-average molecular weight (Mn).

The degree of polymerization is a value measured according to JIS K6720-2, and the polydispersity index is a value obtained by measuring a weight-average molecular weight (Mw) and a number-average molecular weight (Mn) and then dividing the weight-average molecular weight (Mw) with the number-average molecular weight (Mn). In this case, after 0.02 g of the vinyl chloride-vinyl acetate is added to 20 ml of tetrahydrofuran and completely dissolved by stirring for 24 hours, the weight-average molecular weight (Mw) and the number-average molecular weight (Mn) are measured using a gel permeation chromatography (GPC) instrument (Waters 2414, Waters Corporation) and then represented by conversion after drawing a calibration curve using standard samples (S-1.3, S-2.8, S-6.8, S-20, S-51, S-126, S-282, S-791, S-1640, and S-258, Showa Denko k.k.).

As described above, since the vinyl chloride-vinyl acetate copolymer according to the embodiment of the present invention has a polydispersity index of 2.1 to 2.4 at a degree of polymerization of 1,200 to 1,300 and includes the vinyl acetate-derived unit in a specific ratio, the vinyl chloride-vinyl acetate copolymer according to the embodiment of the present invention may exhibit excellent tensile strength even during low-temperature processing. Thus, low-temperature tensile strength of a processed product, which is manufactured by low-temperature processing using the vinyl chloride-vinyl acetate copolymer plastisol, may be excellent.

Specifically, the vinyl chloride-vinyl acetate copolymer according to the embodiment of the present invention may have a tensile strength of 10 MPa to 14 MPa, an elongation (%) of 600% to 1,100%, and a transparency (%) of 80% to 92%.

In this case, samples having a width of 6.25 mm and a thickness of 1.5 mm are prepared by heat-treating the copolymer at 130° C. for 30 minutes, and the tensile strength, the elongation, and the transparency are then respectively measured by using the samples.

Specifically, the samples are prepared by coating a glass plate with a plastisol, which is prepared by mixing 100 g of the vinyl chloride-vinyl acetate copolymer with 60 g of a plasticizer (dioctyl phthalate) and 2 g of a stabilizer (SONG-STAB™ BZ-119, Songwon Industrial Co., Ltd.), to a thickness of 2 mm, and then being left standing for 30 minutes in an oven at a temperature of 130° C., and the samples may denote processed products which are manufactured by low-temperature processing using the vinyl chloride-vinyl acetate copolymer. Herein, since other materials excluding the vinyl chloride-vinyl acetate copolymer, for example, the plasticizer and the stabilizer, are used as additives for ease of processing, the tensile strength, the elongation, and the transparency of the samples may be properties expressed from the vinyl chloride-vinyl acetate copolymer itself.

Also, the tensile strength and the elongation are values which are measured with a tensile strength testing machine (model: 2010, Zwick Roell) according to ASTM D638 using the above samples, and the transparency is measured with a Haze-gard plus (BYK-Gardner GmbH) using the above sample.

Furthermore, the present invention provides a method of preparing the vinyl chloride-vinyl acetate copolymer.

The preparation method according to an embodiment of the present invention includes the steps of: initiating a polymerization reaction after mixing 50 wt % to 80 wt % of a vinyl chloride monomer among a total amount of 100 wt % of the vinyl chloride monomer with 5.5 parts by weight to 10 parts by weight of a vinyl acetate monomer based on the total amount of 100 parts by weight of the vinyl chloride monomer and homogenizing the mixture (step 1); and adding 20 wt % to 50 wt % of the vinyl chloride monomer after the initiation of the polymerization reaction to allow the vinyl chloride monomer to participate in the polymerization reaction (step 2).

The polymerization may be emulsion polymerization and, specifically, may be microemulsion polymerization.

Step 1 is a step of initiating a polymerization reaction using a portion of a vinyl chloride monomer and a vinyl acetate monomer, wherein step 1 may be performed by initiating the polymerization reaction after mixing 50 wt % to 80 wt % of the vinyl chloride monomer among a total amount of 100 wt % of the vinyl chloride monomer with 5.5 parts by weight to 10 parts by weight of the vinyl acetate monomer based on the total amount of 100 parts by weight of the vinyl chloride monomer and homogenizing the mixture. In this case, the polymerization reaction may be performed in a temperature range of 30° C. to 70° C.

Specifically, step 1 may be performed by initiating the polymerization reaction after adding a polymerization initiator and the above-described amounts of the vinyl chloride monomer and vinyl acetate monomer to a reactor filled with an emulsifier, mixing, and homogenizing the mixture.

The reactor filled with an emulsifier may denote a reactor in which a mixed solution including the emulsifier is contained, and the mixed solution may further include an additive, such as polymerized water and an emulsifying aid, in addition to the emulsifier.

The emulsifier is not particularly limited, but may be used in an amount of 0.1 part by weight to 5 parts by weight based on the total amount of 100 parts by weight of the vinyl chloride monomer used in the polymerization. Also, the emulsifier may be at least one selected from the group consisting of linear alkylbenzene sulfonate, sodium lauryl sulfate, lauryl benzene sulfonic acid, alpha-olefin sulfonate, sodium lauryl ethoxylated sulfate, sodium octadecyl sulfate, and sodium lauryl ether sulfate, but the present invention is not limited thereto.

The emulsifying aid is not particularly limited, but, for example, alcohols, such as lauryl alcohol, cetyl alcohol, myristic alcohol, and stearyl alcohol, or higher fatty acids, such as lauric acid, myristic acid, palmitic acid, and stearic acid, may be used.

Also, the mixed solution may further include a reaction inhibitor, if necessary, and the reaction inhibitor may be at least one of hydroquinone, butylated hydroxytoluene, monomethyl ether hydroquinone, quaternary butyl catechol, diphenylamine, triisopropanolamine, and triethanolamine, but the present invention is not limited thereto.

The polymerization initiator is not particularly limited, but may be used in an amount of 0.01 part by weight to 2 parts by weight based on the total amount of 100 parts by weight of the vinyl chloride monomer used in the polymerization. Also, the polymerization initiator may be an oil-soluble polymerization initiator and, specifically, may be at least one selected from the group consisting of cumene hydroperoxide, diisopropylbenzene hydroperoxide, azobisisobutyronitrile, tertiary butyl hydroperoxide, paramenthane hydroperoxide, benzoyl peroxide, and di-2-ethylhexyl peroxydicarbonate, but the present invention is not limited thereto.

The homogenization is not particularly limited, but, for example, may be performed within 1 hour to 3 hours in which, at a temperature of 40° C. or less, particularly under a temperature condition of 5° C. to 15° C., a high pressure homogenizer is operated so that a total pressure of 800 psi to 1,400 psi is respectively distributed to a front end and a rear end in a ratio of 1:9 to 9:1.

Step 2 is a step for preparing a vinyl chloride-vinyl acetate copolymer by adding the reaming vinyl chloride monomer to allow the vinyl chloride monomer to participate in the polymerization reaction, wherein step 2 may be performed by adding the remaining 20 wt % to 50 wt % of the vinyl chloride monomer among the total amount of 100 wt % of the vinyl chloride monomer used in the polymerization to the reactor in step 1 and participating the vinyl chloride monomer in the polymerization reaction. In this case, a weight ratio of the vinyl chloride monomer added before the initiation of the polymerization reaction to the vinyl chloride monomer added after the initiation of the polymerization reaction may be in a range of 4:1 to 1:1.

The vinyl chloride monomer added in step 2, i.e., the 20 wt % to 50 wt % of the vinyl chloride monomer added after the initiation of the polymerization reaction may be collectively added at some point in time, may be dividedly added at several points of time, or may be continuously added in a constant amount for a certain period of time from some point in time until the completion of the polymerization.

Specifically, the 20 wt % to 50 wt % of the vinyl chloride monomer added after the initiation of the polymerization reaction may be collectively added at ⅓ or more of total reaction time, or the 20 wt % to 50 wt % of the vinyl chloride monomer added after the initiation of the polymerization reaction may be continuously added at a feed rate of 3 wt % per hour to 17 wt % per hour from ⅓ or more of the total reaction time. For example, the above-described amount may be collectively added at ½ or more of the total reaction time or may be continuously added.

In this case, the total reaction time represents a time from when an internal temperature of the reactor reaches a polymerization temperature to initiate the polymerization reaction until the polymerization is completed (for example, when an internal pressure of the reactor is reduced to 3.5 kg/cm$^2$).

In the preparation method according to the embodiment of the present invention, since a portion of the vinyl chloride monomer is added to initiate the polymerization reaction and, after the initiation of the polymerization reaction, the remaining vinyl chloride monomer is collectively added at a specific point in time or continuously added, a ratio of the vinyl chloride monomer to the vinyl acetate monomer in a reaction system is appropriately maintained. Thus, the preparation method according to the embodiment of the present invention may easily prepare a vinyl chloride-vinyl acetate copolymer having a desired composition ratio.

Specifically, since the vinyl chloride monomer has better reactivity than the vinyl acetate monomer, there is a need to constantly maintain the ratio of the vinyl chloride monomer to the vinyl acetate monomer in the reactor at an initial stage of the polymerization reaction and during the polymerization in order to easily prepare the vinyl chloride-vinyl acetate copolymer. In a case in which the polymerization reaction is performed by collectively adding the total amount of the vinyl chloride monomer with the vinyl acetate monomer before the initiation of the polymerization, a ratio of the vinyl acetate monomer in the unreacted monomer may be increased at a later stage (e.g., end point) of the polymerization reaction and a heterogenization reaction may increase. As a result, the amount of the vinyl acetate-derived unit in the prepared vinyl chloride-vinyl acetate copolymer may be reduced or the polydispersity index of the copolymer may increase beyond the target range.

Also, the preparation method according to the embodiment of the present invention may further include at least one step among steps of washing, coagulating, and drying, after step 2.

In addition, the present invention provides a plastisol including the vinyl chloride-vinyl acetate copolymer and a processed product manufactured by using the plastisol.

Specifically, the plastisol may include 100 parts by weight of the vinyl chloride-vinyl acetate copolymer and 40 parts by weight to 120 parts by weight of the plasticizer, and may further include an additive, such as a dispersion diluent, a heat stabilizer, a viscosity reducing agent, and a foaming agent, if necessary.

The expression "plastisol" in the present invention denotes a mixture, in which a resin and a plasticizer are mixed so that the mixture may be molded, casted, or processed in the form of a continuous film by heating, and, for example, may denote a paste form in which the vinyl chloride-vinyl acetate copolymer and the plasticizer are mixed.

The expression "plasticizer" in the present invention may denote an organic additive material which plays a role in improving high-temperature moldability of a thermoplastic resin by being added to the resin to increase thermoplasticity.

The plasticizer and the additive are not particularly limited, and those known in the art may be used.

Furthermore, the processed product may be a paste processed product which is manufactured by paste processing using the plastisol. Since the processed product is manufactured by using the plastisol including the vinyl chloride-vinyl acetate copolymer according to the embodiment of the present invention, the processed product may exhibit excellent tensile strength properties as described above.

Hereinafter, the present invention will be described in more detail, according to specific examples and experimental examples. However, the following examples and experimental examples are merely presented to exemplify the present invention, and the scope of the present invention is not limited thereto.

EXAMPLE 1

A mixture, which was prepared by mixing 4 kg of sodium dodecylbenzene sulfonate and 10 kg of fatty acid alcohol with 400 kg of deionized water, was added to a reactor having an internal volume of 1 m$^3$ and equipped with a stirrer, 180 g of di-(2-ethylhexyl)peroxydicarbonate (75%), 300 kg of a vinyl chloride monomer, and 30 kg of a vinyl acetate monomer were added and mixed by stirring vigorously, and homogenization was then performed by operating a homogenizer so that a total pressure of 1,400 psi was respectively distributed to a front end and a rear end in a ratio of 1:1. Thereafter, the homogenized mixture was transferred to a reactor having a volume of 1 m$^3$ and an internal temperature of the reactor was increased to 45° C. to initiate a polymerization reaction. 100 kg of the vinyl chloride monomer was collectively added to the reactor at the time when 7 hours were elapsed after the initiation of the polymerization reaction (at 50% of total reaction time) to allow the vinyl chloride monomer to participate in the polymerization reaction. Thereafter, when an internal pressure of the reactor was reduced to 3.5 kg/cm$^2$, the polymerization reaction was terminated, an unreacted monomer was recovered and removed, and a vinyl chloride-vinyl acetate copolymer latex was obtained. A powdery vinyl chloride-vinyl acetate copolymer was obtained by spray drying the latex. The latex had a pH of 3.07, a total solid content (TSC) of 44.03 wt %, and an average particle diameter of 1.089 μm.

With respect to the average particle diameter of the latex, a weight-average particle diameter was measured at 24,000 rpm using DC24000 UHR (CPS Instruments, Inc).

EXAMPLE 2

A powdery vinyl chloride-vinyl acetate copolymer was obtained in the same manner as in Example 1 except that 100 kg of the vinyl chloride monomer was added at the time when 9 hours were elapsed after the initiation of the polymerization reaction (at about 65% of total reaction time), instead of being added at the time when 7 hours were elapsed after the initiation of the polymerization reaction. Herein, a vinyl chloride-vinyl acetate copolymer latex before spray drying had a pH of 3.43, a total solid content (TSC) of 44.6 wt %, and an average particle diameter of 1.054 μm.

EXAMPLE 3

A powdery vinyl chloride-vinyl acetate copolymer was obtained in the same manner as in Example 1 except that 100 kg of the vinyl chloride monomer was added at the time when hours were elapsed after the initiation of the polymerization reaction (at about 80% of total reaction time), instead of being added at the time when 7 hours were elapsed after the initiation of the polymerization reaction. Herein, a vinyl chloride-vinyl acetate copolymer latex before spray drying had a pH of 3.45, a total solid content (TSC) of 44.18 wt %, and an average particle diameter of 1.051 µm.

EXAMPLE 4

A powdery vinyl chloride-vinyl acetate copolymer was obtained in the same manner as in Example 1 except that 160 g of di-(2-ethylhexyl)peroxydicarbonate (75%) was used, 200 kg, instead of 300 kg, of a vinyl chloride monomer was added before the initiation of the polymerization reaction, and 200 kg of the vinyl chloride monomer was added at the time when hours were elapsed after the initiation of the polymerization reaction (at about 80% of total reaction time). Herein, a vinyl chloride-vinyl acetate copolymer latex before spray drying had a pH of 3.39, a total solid content (TSC) of 44.23 wt %, and an average particle diameter of 1.043 µm.

EXAMPLE 5

A mixture, which was prepared by mixing 4 kg of sodium dodecylbenzene sulfonate and 10 kg of fatty acid alcohol with 400 kg of deionized water, was added to a reactor having an internal volume of 1 m$^3$ and equipped with a stirrer, 180 g of di-(2-ethylhexyl)peroxydicarbonate (75%), 300 kg of a vinyl chloride monomer, and 30 kg of a vinyl acetate monomer were added and mixed by stirring vigorously, and homogenization was then performed by operating a homogenizer so that a total pressure of 1,400 psi was respectively distributed to a front end and a rear end in a ratio of 1:1. Thereafter, the homogenized mixture was transferred to a reactor having a volume of 1 m$^3$ and an internal temperature of the reactor was increased to 45° C. to initiate a polymerization reaction. 100 kg of the vinyl chloride monomer was uniformly and continuously added for 7 hours (added at about 15 kg/hr) from the time when 7 hours were elapsed after the initiation of the polymerization reaction (at 50% of total reaction time) to allow the vinyl chloride monomer to participate in the polymerization reaction. Thereafter, when an internal pressure of the reactor was reduced to 3.5 kg/cm$^2$, the polymerization reaction was terminated, an unreacted monomer was recovered and removed, and a vinyl chloride-vinyl acetate copolymer latex was obtained. A powdery vinyl chloride-vinyl acetate copolymer was obtained by spray drying the latex obtained. Herein, the vinyl chloride-vinyl acetate copolymer latex before the spray drying had a pH of 3.26, a total solid content (TSC) of 44.52 wt %, and an average particle diameter of 1.024 µm.

EXAMPLE 6

A powdery vinyl chloride-vinyl acetate copolymer was obtained in the same manner as in Example 5 except that 100 kg of the vinyl chloride monomer was uniformly and continuously added for 3 hours (added at about 33 kg/hr) from the time when 11 hours were elapsed after the initiation of the polymerization reaction (at about 80% of total reaction time). Herein, a vinyl chloride-vinyl acetate copolymer latex before spray drying had a pH of 3.39, a total solid content (TSC) of 44.22 wt %, and an average particle diameter of 1.017 µm.

EXAMPLE 7

A powdery vinyl chloride-vinyl acetate copolymer was obtained in the same manner as in Example 5 except that 200 kg, instead of 300 kg, of a vinyl chloride monomer was added before the initiation of the polymerization reaction, and 100 kg of the vinyl chloride monomer was uniformly and continuously added for 3 hours (added at about 67 kg/hr) from the time when 11 hours were elapsed after the initiation of the polymerization reaction (at about 80% of total reaction time). Herein, a vinyl chloride-vinyl acetate copolymer latex before spray drying had a pH of 3.43, a total solid content (TSC) of 44.33 wt %, and an average particle diameter of 0.995 µm.

EXAMPLE 8

A powdery vinyl chloride-vinyl acetate copolymer was obtained in the same manner as in Example 1 except that 23 kg, instead of 30 kg, of a vinyl acetate monomer was used. Herein, a vinyl chloride-vinyl acetate copolymer latex before spray drying had a pH of 3.41, a total solid content (TSC) of 44.17 wt %, and an average particle diameter of 1.105 µm.

EXAMPLE 9

A powdery vinyl chloride-vinyl acetate copolymer was obtained in the same manner as in Example 1 except that 40 kg, instead of 30 kg, of a vinyl acetate monomer was used. Herein, a vinyl chloride-vinyl acetate copolymer latex before spray drying had a pH of 3.19, a total solid content (TSC) of 44.04 wt %, and an average particle diameter of 1.074 µm.

EXAMPLE 10

A powdery vinyl chloride-vinyl acetate copolymer was obtained in the same manner as in Example 1 except that 320 kg, instead of 300 kg, of a vinyl chloride monomer was added before the initiation of the polymerization reaction, and 80 kg of the vinyl chloride monomer was added at the time when 7 hours were elapsed after the initiation of the polymerization reaction (at about 50% of total reaction time). Herein, a vinyl chloride-vinyl acetate copolymer latex before spray drying had a pH of 3.4, a total solid content (TSC) of 44.32 wt %, and an average particle diameter of 1.0 µm.

COMPARATIVE EXAMPLE 1

A mixture, which was prepared by mixing 4 kg of sodium dodecylbenzene sulfonate and 10 kg of fatty acid alcohol with 400 kg of deionized water, was added to a reactor having an internal volume of 1 m$^3$ and equipped with a stirrer, 180 g of di-(2-ethylhexyl)peroxydicarbonate (75%), 400 kg of a vinyl chloride monomer, and 30 kg of a vinyl acetate monomer were added and mixed by stirring vigorously, and homogenization was then performed by operating a homogenizer so that a total pressure of 1,400 psi was respectively distributed to a front end and a rear end in a ratio of 1:1. Thereafter, the homogenized mixture was transferred to a reactor having a volume of 1 m$^3$ and an internal temperature of the reactor was increased to 45° C. to initiate a polymerization reaction. Thereafter, when an internal pressure of the reactor was reduced to 3.5 kg/cm$^2$, the polymerization reaction was terminated, an unreacted monomer was recovered and removed, and a vinyl chloride-vinyl acetate copolymer latex was obtained. A powdery vinyl chloride-vinyl acetate copolymer was obtained by spray drying the latex obtained. Herein, the vinyl chloride-vinyl acetate copolymer latex before the spray drying had a pH of 3.12, a total solid content (TSC) of 44.84 wt %, and an average particle diameter of 1.017 μm.

COMPARATIVE EXAMPLE 2

A powdery vinyl chloride polymer was obtained in the same manner as in Comparative Example 1 except that 430 kg of a vinyl chloride monomer was used and a vinyl acetate monomer was not used. Herein, a vinyl chloride polymer latex before spray drying had a pH of 3.21, a total solid content (TSC) of 44.50 wt %, and an average particle diameter of 1.091 μm.

COMPARATIVE EXAMPLE 3

A powdery vinyl chloride-vinyl acetate copolymer was obtained in the same manner as in Comparative Example 1 except that 25 kg of a vinyl acetate monomer was used. Herein, a vinyl chloride-vinyl acetate copolymer latex before spray drying had a pH of 3.41, a total solid content (TSC) of 44.59 wt %, and an average particle diameter of 1.059 μm.

COMPARATIVE EXAMPLE 4

A powdery vinyl chloride-vinyl acetate copolymer was obtained in the same manner as in Example 1 except that 20 kg of a vinyl acetate monomer was used. Herein, a vinyl chloride-vinyl acetate copolymer latex before spray drying had a pH of 3.35, a total solid content (TSC) of 44.37 wt %, and an average particle diameter of 1.072 μm.

COMPARATIVE EXAMPLE 5

A powdery vinyl chloride-vinyl acetate copolymer was obtained in the same manner as in Example 1 except that 42 kg of a vinyl acetate monomer was used. Herein, a vinyl chloride-vinyl acetate copolymer latex before spray drying had a pH of 3.35, a total solid content (TSC) of 44.01 wt %, and an average particle diameter of 1.098 μm.

COMPARATIVE EXAMPLE 6

A powdery vinyl chloride-vinyl acetate copolymer was obtained in the same manner as in Example 1 except that 60 kg of a vinyl acetate monomer was used. Herein, a vinyl chloride-vinyl acetate copolymer latex before spray drying had a pH of 3.32, a total solid content (TSC) of 43.87 wt %, and an average particle diameter of 1.078 μm.

COMPARATIVE EXAMPLE 7

A powdery vinyl chloride-vinyl acetate copolymer was obtained in the same manner as in Example 1 except that 335 kg, instead of 300 kg, of a vinyl chloride monomer was added before the initiation of the polymerization reaction, and 65 kg of the vinyl chloride monomer was added at the time when 7 hours were elapsed after the initiation of the polymerization reaction (at about 50% of total reaction time). Herein, a vinyl chloride-vinyl acetate copolymer latex before spray drying had a pH of 3.36, a total solid content (TSC) of 44.21 wt %, and an average particle diameter of 1.094 μm.

COMPARATIVE EXAMPLE 8

A polymerization reaction was performed in the same manner as in Example 1 except that 135 kg, instead of 300 kg, of a vinyl chloride monomer was added before the initiation of the polymerization reaction, and 265 kg of the vinyl chloride monomer was added at the time when 7 hours were elapsed after the initiation of the polymerization reaction (at about 50% of total reaction time), but a copolymer was not formed due to excessive occurrence of an agglomeration phenomenon.

EXPERIMENTAL EXAMPLE 1

Physical properties of each vinyl chloride-vinyl acetate copolymer prepared in Examples 1 to 10 and Comparative Examples 1 and 3 to 8 and the vinyl chloride polymer prepared in Comparative Example 2 were comparatively analyzed. The results thereof are presented in Table 1 below.

(1) Vinyl Acetate Content (wt %)

After 5 mg of each copolymer and 0.5 ml of THF-d8 were put in a 1 ml vial and stirred for 12 hours to prepare each sample, quantitative analysis was performed by using an Agilent 500 MHz nuclear magnetic resonance (NMR) spectrometer, and a vinyl acetate content in each copolymer was obtained with the following Equation 1 using results of the quantitative analysis.

$$\% \ VAc = \frac{S_{VAc} \times M_{VAc}}{S_{VCM} \times M_{VCM} + S_{VAc} \times M_{VAc}} \quad \text{[Equation 1]}$$

In Equation 1, S represents an integral value of a methane proton peak, M represents a molecular weight, VAc represents vinyl acetate, and VCM represents a vinyl chloride monomer.

(2) Degree of Polymerization Measurement

A degree of polymerization was measured according to JIS K6720-2.

(3) Weight-Average Molecular Weight (Mw), Number-Average Molecular Weight (Mn), and Polydispersity Index (PDI)

After a weight-average molecular weight (Mw) and a number-average molecular weight (Mn) were measured, the polydispersity index was obtained by dividing the weight-average molecular weight (Mw) with the number-average molecular weight (Mn). After 0.02 g of each vinyl chloride-vinyl acetate copolymer or the vinyl chloride polymer was added to 20 ml of tetrahydrofuran and completely dissolved by stirring for 24 hours, the weight-average molecular weight (Mw) and the number-average molecular weight (Mn) were measured using a gel permeation chromatography (GPC) instrument (Waters 2414, Waters Corporation) and then obtained by conversion after drawing a calibration curve using standard samples (S-1.3, S-2.8, S-6.8, S-20, S-51, S-126, S-282, S-791, S-1640, and S-258, Showa Denko k.k.).

TABLE 1

| Category | Vinyl acetate content (wt %) | Degree of polymerization (DP) | Weight-average molecular weight (g/mol) | Number-average molecular weight (g/mol) | Poly-dispersity index |
|---|---|---|---|---|---|
| Example 1 | 5.36 | 1250 | 164294 | 70590 | 2.33 |
| Example 2 | 5.41 | 1260 | 164010 | 70089 | 2.34 |
| Example 3 | 5.47 | 1250 | 160978 | 70319 | 2.29 |
| Example 4 | 5.52 | 1240 | 162276 | 72075 | 2.25 |
| Example 5 | 5.58 | 1260 | 161423 | 69887 | 2.31 |
| Example 6 | 5.60 | 1250 | 163641 | 72093 | 2.27 |
| Example 7 | 5.65 | 1270 | 162539 | 74949 | 2.17 |
| Example 8 | 4.09 | 1260 | 164328 | 70046 | 2.35 |
| Example 9 | 7.00 | 1240 | 161630 | 65890 | 2.40 |
| Example 10 | 5.29 | 1250 | 164191 | 69484 | 2.36 |
| Comparative Example 1 | 5.5 | 1260 | 161865 | 64772 | 2.50 |
| Comparative Example 2 | — | 1270 | 168320 | 66790 | 2.52 |
| Comparative Example 3 | 4.71 | 1250 | 165680 | 68690 | 2.41 |
| Comparative Example 4 | 3.56 | 1260 | 164289 | 67730 | 2.46 |
| Comparative Example 5 | 8.02 | 1220 | 160417 | 63914 | 2.51 |
| Comparative Example 6 | 11.96 | 1190 | 161059 | 63093 | 2.55 |
| Comparative Example 7 | 5.13 | 1240 | 168448 | 70012 | 2.41 |
| Comparative Example 8 | N/A | N/A | N/A | N/A | N/A |

As illustrated in Table 1, with respect to the vinyl chloride-vinyl acetate copolymers of Examples 1 to 10 according to the embodiment of the present invention, amounts of the vinyl acetate-derived unit and polydispersity indices were within desired ranges, but, with respect to the vinyl chloride-vinyl acetate copolymers of Comparative Examples 1 to 7 or the vinyl chloride polymer, polydispersity indices were higher than 2.4, the maximum value of the desired range, and, with respect to Comparative Example 8, since a copolymer was not formed properly due to a latex agglomeration phenomenon, measurement was not possible.

Herein, the vinyl chloride-vinyl acetate copolymers of Comparative Examples 1 and 3 were prepared under the same conditions as Example 1 except that the total amount of the vinyl chloride monomer was collectively added before the initiation of the polymerization, the vinyl chloride-vinyl acetate copolymers of Comparative Examples 4 to 6 were prepared under the same conditions as Example 1 except that the amount of the vinyl acetate was outside the range suggested in the present invention, and the vinyl chloride-vinyl acetate copolymers of Comparative Examples 7 and 8 were prepared under the same conditions as Example 1 except that a split addition ratio of the vinyl chloride monomer was outside the range suggested in the present invention.

The above results indicated that the method of adding the vinyl chloride monomer and the ratio according to the time of addition, i.e., the ratio between the monomers participating in the polymerization during the polymerization, as well as the amount of the vinyl acetate may be important to obtain a vinyl chloride-vinyl acetate copolymer having a desired polydispersity index.

EXPERIMENTAL EXAMPLE 2

In order to comparatively analyze processing characteristics and tensile strength properties of processed products which were manufactured by using each vinyl chloride-vinyl acetate copolymer of Examples 1 to 10 and Comparative Examples 1 and 3 to 8 and the vinyl chloride polymer of Comparative Example 2, viscosity of plastisol before low-temperature processing, tensile strength during the low-temperature processing, tensile elongation, and transparency were analyzed. The results thereof are presented in Table 2 below.

First, each plastisol was prepared by adding 60 g of dioctyl phthalate and 2 g of a stabilizer (SONGSTAB BZ-119, Songwon Industrial Co., Ltd.) to 100 g of each copolymer or the polymer and being stirred with a stirrer for 10 minutes. The prepared plastisol was coated on a glass plate and spread to a thickness of 2 mm by using a film applicator, and the glass plate was then left standing in an oven (Mathis Oven CH-8156) at a temperature of 130° C. for 30 minutes to prepare each sheet. Long dumbbell-shaped samples (Dogbone, width 6.25 mm, thickness 1.5 mm) were prepared from each sheet and, after each sample was pulled at a cross-head speed of 500 mm/min using a tensile strength testing machine (model: 2010, Zwick Roell) according to ASTM D638, tensile strength and elongation (%) at the point where each sample was broken were measured.

A portion of each plastisol prepared before the low-temperature processing was aged for 1 hour in a thermostat at 25° C. with a relative humidity of 50%, and viscosity was then measured using a Brookfield LV-type viscometer with a LV-3 (#63) spindle at 6 rpm.

Transparency of each sheet was measured with a Haze-gard plus (BYK-Gardner GmbH).

TABLE 2

| Category | Viscosity (cP) | Tensile strength (MPa) | Elongation (%) | Transparency (%) |
|---|---|---|---|---|
| Example 1 | 6,200 | 10.33 | 697 | 82.7 |
| Example 2 | 7,000 | 12.03 | 778 | 86.2 |
| Example 3 | 5,500 | 13.11 | 893 | 89.2 |
| Example 4 | 6,900 | 13.47 | 824 | 89.6 |
| Example 5 | 5,300 | 12.89 | 834 | 88.0 |
| Example 6 | 5,900 | 13.18 | 907 | 89.4 |
| Example 7 | 5,800 | 13.71 | 933 | 89.7 |
| Example 8 | 5,400 | 10.03 | 623 | 81.4 |
| Example 9 | 8,400 | 11.43 | 1010 | 90.3 |
| Example 10 | 6,700 | 10.3 | 669 | 82.1 |
| Comparative Example 1 | 6,300 | 9.3 | 662 | 77.4 |
| Comparative Example 2 | 5,300 | 6.2 | 493 | 74.8 |
| Comparative Example 3 | 5,700 | 8.92 | 654 | 78.9 |
| Comparative Example 4 | 5,400 | 8.12 | 614 | 78.1 |
| Comparative Example 5 | 9,400 | 9.7 | 1016 | 90.4 |
| Comparative Example 6 | 12,500 | 8.26 | 1123 | 90.6 |
| Comparative Example 7 | 6,900 | 9.91 | 645 | 81.3 |
| Comparative Example 8 | N/A | N/A | N/A | N/A |

As illustrated in Table 2, the processed products manufactured by using the vinyl chloride-vinyl acetate copolymers of Examples 1 to 10 according to the embodiment of the present invention had significantly increased tensile strengths and elongations while generally having excellent transparencies in comparison to the processed products manufactured by using the vinyl chloride-vinyl acetate copolymers of Comparative Examples 1 and 3 to 7 and the vinyl chloride polymer of Comparative Example 2.

Specifically, with respect to the processed products manufactured by using the vinyl chloride-vinyl acetate copolymers of Comparative Examples 1, 3 and 7, in which the vinyl acetate-derived unit is included within the amount range suggested in the present invention, but the polydispersity indices are outside the range suggested in the present invention, transparencies were reduced to a maximum level of 85% and low-temperature tensile strengths were reduced to a maximum level of 65% in comparison to the processed products manufactured by using the vinyl chloride-vinyl acetate copolymers of Examples 1 to 10.

Also, with respect to the processed product manufactured by using the vinyl chloride polymer of Comparative Example 2 which did not include the vinyl acetate-derived unit, transparency was significantly reduced to a level of 82.3% to 92%, tensile strength was significantly reduced to a level of 45% to 62%, and elongation was significantly reduced to a level of 49% to 79% in comparison to the vinyl chloride-vinyl acetate copolymers of Examples 1 to 10.

In addition, as a result of comparing the processed products manufactured by using the vinyl chloride-vinyl acetate copolymers of Comparative Examples 4 to 6, which included the vinyl acetate-derived unit in an amount outside the range of 4 wt % to 7 wt %, with the processed products manufactured by using the vinyl chloride-vinyl acetate copolymers of Examples 8 and 9, with respect to the processed product manufactured by using the vinyl chloride-vinyl acetate copolymer of Comparative Example 4, elongation was reduced, transparency was reduced by about 4%, and tensile strength was significantly reduced by 19% in comparison to the processed product manufactured by using the vinyl chloride-vinyl acetate copolymer of Example 8. Furthermore, with respect to the processed products manufactured by using the vinyl chloride-vinyl acetate copolymers of Comparative Examples 5 and 6, similar levels of elongation and transparency were respectively obtained, but low-temperature tensile strengths were respectively significantly reduced to levels of 85% and 72%, and viscosities were rapidly increased in comparison to the processed product manufactured by using the vinyl chloride-vinyl acetate copolymer of Example 9.

The above results indicated that the polydispersity index and the amount of the vinyl acetate-derived unit played an important role in achieving excellent low-temperature tensile strength properties while affecting the improvement of processing characteristics (transparency). Thus, the vinyl chloride-vinyl acetate copolymer according to the embodiment of the present invention may exhibit significantly improved low-temperature tensile strength properties as well as excellent processing characteristics by having a controlled polydispersity index while including the vinyl acetate-derived unit in a specific amount range.

The invention claimed is:

1. A vinyl chloride-vinyl acetate copolymer which has a polydispersity index (PDI) of 2.1 to 2.4 at a degree of polymerization of 1,200 to 1,300 and comprises 4 wt % to 7 wt % of a vinyl acetate-derived unit.

2. The vinyl chloride-vinyl acetate copolymer of claim 1, wherein the copolymer has a polydispersity index (PDI) of greater than 2.1 and less than 2.3.

3. The vinyl chloride-vinyl acetate copolymer of claim 1, wherein the copolymer has a weight-average molecular weight (Mw) of 160,000 g/mol to 165,000 g/mol.

4. The vinyl chloride-vinyl acetate copolymer of claim 1, wherein the copolymer comprises 5 wt % to 6 wt % of the vinyl acetate-derived unit.

5. The vinyl chloride-vinyl acetate copolymer of claim 1, wherein the copolymer has a tensile strength of 10 MPa to 14 MPa, and
wherein the tensile strength is measured according to ASTM D638 after a sample having a width of 6.25 mm and a thickness of 1.5 mm is prepared by heat-treating the copolymer at 130° C. for 30 minutes.

6. The vinyl chloride-vinyl acetate copolymer of claim 1, wherein the copolymer has an elongation (%) of 600% to 1,100%, and
wherein the elongation is measured according to ASTM D638 after a sample having a width of 6.25 mm and a thickness of 1.5 mm is prepared by heat-treating the copolymer at 130° C. for 30 minutes.

7. The vinyl chloride-vinyl acetate copolymer of claim 1, wherein the copolymer has a transparency (%) of 80% to 92%, and
wherein the transparency is measured with a haze meter after a sample having a width of 6.25 mm and a thickness of 1.5 mm is prepared by heat-treating the copolymer at 130° C. for 30 minutes.

8. A method of preparing the vinyl chloride-vinyl acetate copolymer of claim 1, the method comprising steps of:
(1) initiating a polymerization reaction after mixing 50 wt % to 80 wt % of a vinyl chloride monomer among a total amount of 100 wt % of the vinyl chloride monomer with 5.5 parts by weight to 10 parts by weight of vinyl acetate based on the total amount of 100 parts by weight of the vinyl chloride monomer and homogenizing the mixture; and
(2) adding 20 wt % to 50 wt % of the vinyl chloride monomer after the initiation of the polymerization reaction to allow the vinyl chloride monomer to participate in the polymerization reaction.

9. The method of claim 8, wherein the 20 wt % to 50 wt % of the vinyl chloride monomer of step (2) is collectively added at ⅓ or more of total reaction time.

10. The method of claim 8, wherein the 20 wt % to 50 wt % of the vinyl chloride monomer of step (2) is continuously added at a feed rate of 3 wt % per hour to 17 wt % per hour from ⅓ or more of total reaction time.

11. The method of claim 8, wherein a weight ratio of the vinyl chloride monomer of step (1) to the vinyl chloride monomer of step (2) is in a range of 4:1 to 1:1.

12. The method of claim 8, wherein the polymerization reaction is performed in a temperature range of 30° C. to 70° C.

13. The method of claim 8, wherein the polymerization reaction is performed in the presence of an emulsifier and a polymerization initiator.

14. The method of claim 13, wherein the emulsifier comprises at least one selected from the group consisting of linear alkylbenzene sulfonate, sodium lauryl sulfate, lauryl benzene sulfonic acid, alpha-olefin sulfonate, sodium lauryl ethoxylated sulfate, sodium octadecyl sulfate, and sodium lauryl ether sulfate.

15. The method of claim 13, wherein the polymerization initiator is an oil-soluble polymerization initiator.

16. The method of claim 13, wherein the polymerization initiator comprises at least one selected from the group consisting of cumene hydroperoxide, diisopropylbenzene hydroperoxide, azobisisobutyronitrile, tertiary butyl hydroperoxide, paramenthane hydroperoxide, benzoyl peroxide, and di-2-ethylhexyl peroxydicarbonate.

17. The method of claim 8, further comprising at least one step of washing, coagulating, and drying, after step (2).

\* \* \* \* \*